(12) United States Patent
Saunders et al.

(10) Patent No.: US 11,746,726 B2
(45) Date of Patent: Sep. 5, 2023

(54) AIRCRAFT PROPULSION SYSTEM NOZZLE WITH INTERNAL FLOW PASSAGE

(71) Applicant: Rohr, Inc., Chula Vista, CA (US)

(72) Inventors: Adam Saunders, El Cajon, CA (US); Bryce T. Kelford, San Diego, CA (US); Travis M. Frazier, Austin, TX (US); Richard Haslim, Chula Vista, CA (US); Richard S. Alloway, San Diego, CA (US); Vijay V. Pujar, San Diego, CA (US)

(73) Assignee: Rohr, Inc., Chula Vista, CA (US)

(*) Notice: Subject to any disclaimer, the term of this patent is extended or adjusted under 35 U.S.C. 154(b) by 0 days.

(21) Appl. No.: 17/307,570

(22) Filed: May 4, 2021

(65) Prior Publication Data

US 2021/0348581 A1    Nov. 11, 2021

Related U.S. Application Data

(60) Provisional application No. 63/020,257, filed on May 5, 2020.

(51) Int. Cl.
*F02K 1/52* (2006.01)
*B64D 29/06* (2006.01)
(Continued)

(52) U.S. Cl.
CPC ............... *F02K 1/52* (2013.01); *B64D 27/18* (2013.01); *B64D 29/06* (2013.01); *F02K 1/805* (2013.01);
(Continued)

(58) Field of Classification Search
CPC .... F02C 6/08; F02C 7/18; F02C 7/185; F02C 7/20; F02K 1/04; F02K 1/38; F02K 1/386; F02K 1/822; F02K 1/46; F02K 1/52; F02K 1/805; F02K 1/80; F02K 1/82; F02K 1/827; F02K 3/06; B64D 27/26; B64D 27/18; B64D 33/06; B64D 2033/024; B64D 33/04; B64D 29/00; B64D 29/06;
(Continued)

(56) References Cited

U.S. PATENT DOCUMENTS

| 8,128,100 B2* | 3/2012 | Bogue | F16J 15/3284 415/214.1 |
| 8,250,852 B2* | 8/2012 | Porte | F02K 3/115 60/785 |

(Continued)

FOREIGN PATENT DOCUMENTS

GB    2164706 B    6/1988

OTHER PUBLICATIONS

Search report for EP21172091.7 dated Feb. 22, 2022.

*Primary Examiner* — Eric J Zamora Alvarez
(74) *Attorney, Agent, or Firm* — GETZ BALICH LLC

(57) ABSTRACT

An assembly is provided for an aircraft propulsion system. This assembly includes a nozzle extending axially along and circumferentially about an axial centerline. The nozzle includes a nozzle panel and a nozzle fairing fixedly connected to the nozzle panel at an axial end of the nozzle. The nozzle is configured with an internal flow passage radially between the nozzle panel and the nozzle fairing. The internal flow passage extends axially within the nozzle to an outlet between the nozzle panel and the nozzle fairing at the axial end of the nozzle.

15 Claims, 11 Drawing Sheets

(51) Int. Cl.
*F02K 1/80* (2006.01)
*F02K 1/04* (2006.01)
*F02K 1/82* (2006.01)
*F02K 1/38* (2006.01)
*B64D 27/26* (2006.01)
*B64D 27/18* (2006.01)
*F02K 3/06* (2006.01)

(52) U.S. Cl.
CPC ............... *F02K 3/06* (2013.01); *B64D 27/26* (2013.01); *F05D 2220/323* (2013.01); *F05D 2240/128* (2013.01)

(58) Field of Classification Search
CPC ........... F05D 2220/32; F05D 2220/323; F05D 2240/128; F05D 2260/963; F01D 25/30; F01D 17/105; F01D 25/14; F01D 25/24; F01D 11/005; F01D 25/26; F01D 9/04; B64C 7/02; Y02T 50/60
See application file for complete search history.

(56) References Cited

U.S. PATENT DOCUMENTS

| | | | |
|---|---|---|---|
| 8,484,943 B2 | 7/2013 | Cunha | |
| 8,740,550 B2 | 6/2014 | Tanioka | |
| 9,435,224 B2 | 9/2016 | Raison | |
| 10,040,560 B2 | 8/2018 | Willie | |
| 2003/0140615 A1 | 7/2003 | Le Docte | |
| 2012/0247083 A1 | 10/2012 | Leyko | |
| 2014/0318149 A1* | 10/2014 | Guillon | F02C 7/25 277/597 |
| 2017/0037813 A1 | 2/2017 | Dindar | |
| 2017/0145957 A1* | 5/2017 | Iglewski | F02K 1/78 |
| 2018/0119642 A1 | 5/2018 | Steele | |
| 2019/0128215 A1 | 5/2019 | Gower | |

* cited by examiner

AIRCRAFT PROPULSION SYSTEM NOZZLE WITH INTERNAL FLOW PASSAGE This application claims priority to U.S. Patent Appln. No. 63/020,257 filed May 5, 2020, which is hereby incorporated herein by reference in its entirety.

BACKGROUND

1. Technical Field

This disclosure relates generally to an aircraft propulsion system and, more particularly, to a nozzle system for the aircraft propulsion system.

2. Background Information

A modern aircraft propulsion system includes a gas turbine engine and a nacelle housing the gas turbine engine. As gas turbine engine designs are continually pushed for increased efficiency and/or increased thrust, gas temperatures within the gas turbine engine typically increase. These high gas temperatures may cause certain components of the aircraft propulsion system to prematurely degrade and require replacement. This is true particularly for components of the aircraft propulsion system, such as a core nozzle system, that are directly exposed to engine combustion products. There is a need in the art therefore for an improved nozzle system which can accommodate increasing gas temperatures within a gas turbine engine.

SUMMARY OF THE DISCLOSURE

According to an aspect of the present disclosure, an assembly is provided for an aircraft propulsion system. This assembly includes a nozzle extending axially along and circumferentially about an axial centerline. The nozzle includes a nozzle panel and a nozzle fairing fixedly connected to the nozzle panel at an axial end of the nozzle. The nozzle is configured with an internal flow passage radially between the nozzle panel and the nozzle fairing. The internal flow passage extends axially within the nozzle to an outlet between the nozzle panel and the nozzle fairing at the axial end of the nozzle.

According to another aspect of the present disclosure, another assembly is provided for an aircraft propulsion system. This assembly includes a structure that includes a core nozzle and a core flow path. The core flow path extends axially along an axial centerline within the structure to an axial end of the core nozzle. The core nozzle forms a peripheral outer boundary of the core flow path at the axial end. The core nozzle includes an internal flow passage that extends axially along the axial centerline within the core nozzle to a fixed area outlet at the axial end.

According to still another aspect of the present disclosure, still another assembly is provided for an aircraft propulsion system. This assembly includes a pylon structure and a second structure that is configured as or otherwise includes a nozzle. The nozzle includes an internal flow passage that extends axially along an axial centerline within the nozzle to a fixed area outlet at an axial end of the nozzle. The internal flow passage is aligned with and is below the pylon structure.

The outlet/the fixed area outlet may be angled to direct outlet air onto a heat shield of a/the pylon structure.

The internal flow passage may be isolated from the pylon structure.

The core nozzle may include a nozzle panel and a nozzle fairing connected to the nozzle panel at the axial end. The internal flow passage may be radially between the nozzle panel and the nozzle fairing. The fixed area outlet may be radially between the nozzle panel and the nozzle fairing at the axial end.

The nozzle fairing may be radially outboard of and may overlap the nozzle panel.

The nozzle panel may form a peripheral outer portion of a core flow path within the aircraft propulsion system. The internal flow passage may be radially outboard of the core flow path.

The nozzle fairing may be fixedly connected to the nozzle panel through a plurality of spacers. Each of the spacers may extend radially between and may be connected to the nozzle panel and the nozzle fairing. The outlet may be configured as or otherwise include an outlet orifice. The outlet orifice may be formed circumferentially between and by a neighboring pair of the plurality of spacers. The outlet orifice may be formed radially between and by the nozzle panel and the nozzle fairing.

The nozzle fairing may be fixedly relative to the nozzle panel through a plurality of spacers. Each of the spacers may extend radially between the nozzle panel and the nozzle fairing. The outlet may be configured as or otherwise include an outlet orifice. The outlet orifice may be formed circumferentially between and by a neighboring pair of the plurality of spacers. The outlet orifice may be formed radially between and by the nozzle panel and the nozzle fairing.

Each of the spacers may be fixedly connected to the nozzle panel and/or the nozzle fairing.

The outlet may include a plurality of outlet orifices arranged circumferentially about the axial centerline at the axial end of the nozzle. The internal flow passage extends axially within the nozzle to the outlet orifices.

The outlet may be configured as or otherwise include a fixed area outlet.

The assembly may include a pylon structure. The internal flow passage may be arranged below and circumferentially aligned with the pylon structure.

The internal flow passage may be arranged at a top-center location of the nozzle.

The nozzle may also include a pair of walls. Each of the walls may extend radially between the nozzle panel and the nozzle fairing. The internal flow passage may extend circumferentially between the pair of walls.

The nozzle may also include a wall. The wall may extend radially between the nozzle panel and the nozzle fairing. The internal flow passage may extend circumferentially to the wall.

An aperture may extend radially through a sidewall of the nozzle fairing. The aperture may fluidly couple the internal flow passage with a plenum radially outboard of the nozzle fairing.

The nozzle may also include a scoop configured to direct air, which is within a plenum radially outboard of the nozzle fairing, into the internal flow passage.

The assembly may also include a fluid source fluidly coupled with and configured to provide fluid to the internal flow passage.

The fluid source may be configured as or otherwise include a nacelle core compartment.

The fluid source may be configured as or otherwise include a bypass duct.

The assembly may also include a pylon structure and a seal element. The seal element may seal a gap between the nozzle fairing and the pylon structure. The seal element may extend circumferentially about the axial centerline.

The assembly may also include an outer nacelle structure, an inner nacelle structure and a bypass flow path. The inner nacelle structure may be within the outer nacelle structure. The inner nacelle structure may extend axially along the centerline to the axial end of the nozzle. The bypass flow path may be formed radially between the outer nacelle structure and the inner nacelle structure.

The nozzle may also be configured with a second internal flow passage radially between the nozzle panel and the nozzle fairing. The second internal flow passage may extend axially within the nozzle to a second outlet between the nozzle panel and the nozzle fairing at the axial end of the nozzle. The second internal flow passage may be circumferentially adjacent the internal flow passage.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
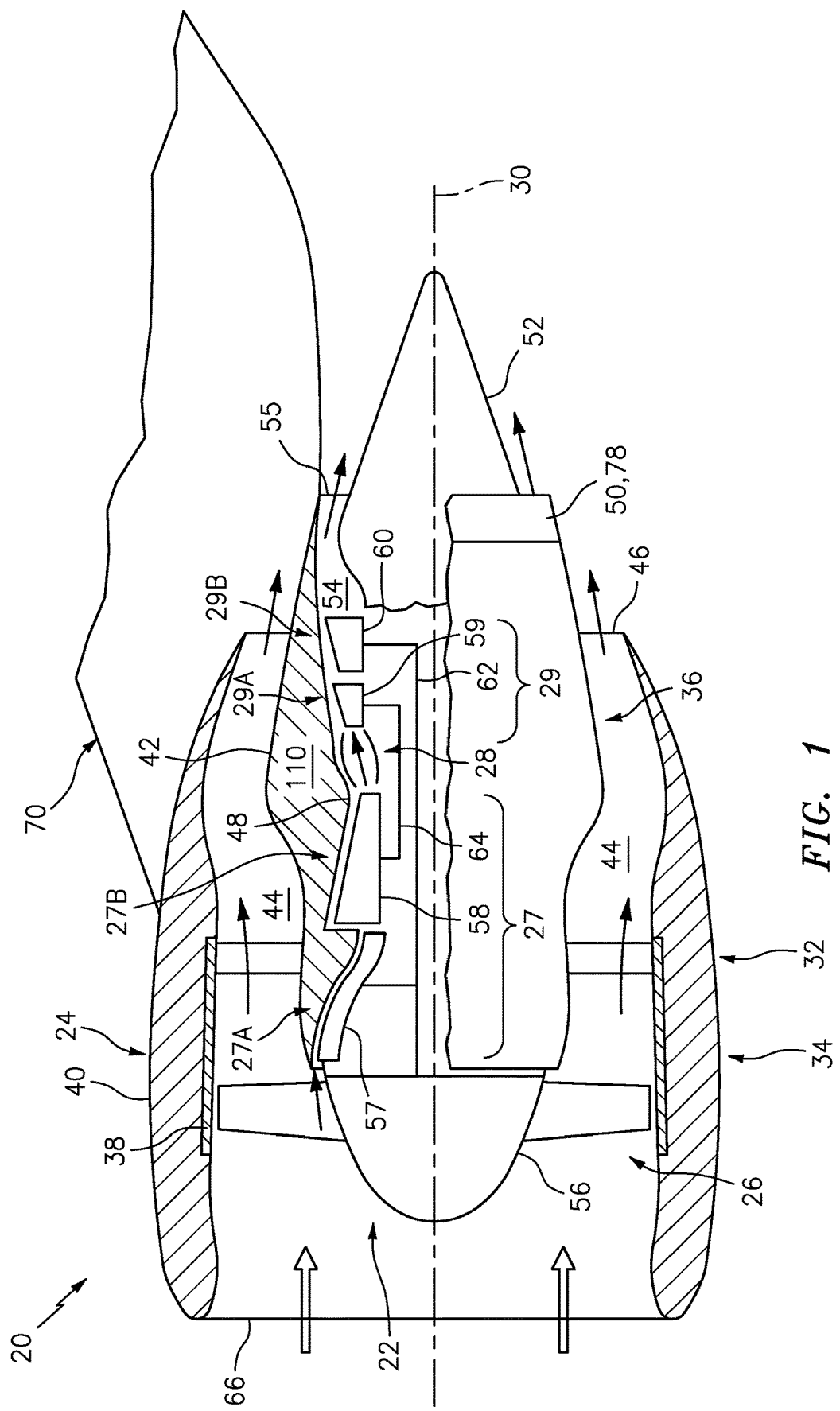
FIG. 1 is a side cutaway illustration of an aircraft propulsion system with a turbofan gas turbine engine.

FIG. 1 illustrates an aircraft propulsion system 20 for an aircraft such as, but not limited to, a commercial airliner or cargo plane. The aircraft propulsion system 20 includes a gas turbine engine 22 and a nacelle 24.

The gas turbine engine 22 may be configured as a high-bypass turbofan engine. The gas turbine engine 22 of FIG. 1, for example, includes a fan section 26, a compressor section 27, a combustor section 28 and a turbine section 29.

The compressor section 27 may include a low pressure compressor (LPC) section 27A and a high pressure compressor (HPC) section 27B. The turbine section 29 may include a high pressure turbine (HPT) section 29A and a low pressure turbine (LPT) section 29B.

The engine sections 26-29B are arranged sequentially along an axial centerline 30 (e.g., a rotational axis) of the gas turbine engine 22 within an aircraft propulsion system housing 32. This housing 32 includes an outer housing structure 34 and an inner housing structure 36.

The outer housing structure 34 includes an outer case 38 (e.g., a fan case) and an outer structure 40 of the nacelle 24; i.e., an outer nacelle structure. The outer case 38 houses at least the fan section 26. The outer nacelle structure 40 houses and provides an aerodynamic cover the outer case 38. The outer nacelle structure 40 also covers a portion of an inner structure 42 of the nacelle 24; i.e., an inner nacelle structure, which may also be referred to as an inner fixed structure. More particularly, the outer nacelle structure 40 axially overlaps and extends circumferentially about (e.g., completely around) the inner nacelle structure 42. The outer nacelle structure 40 and the inner nacelle structure 42 thereby at least partially or completely form a bypass flow path 44. This bypass flow path 44 extends axially along the axial centerline 30 within the aircraft propulsion system 20 to a bypass nozzle outlet 46, where the bypass flow path 44 is radially between the nacelle structures 34 and 36.

The inner housing structure 36 includes an inner case 48 (e.g., a core case) and the inner nacelle structure 42. The inner case 48 houses one or more of the engine sections 27A-29B, which engine sections 27A-29B may be collectively referred to as an engine core. The inner nacelle structure 42 houses and provides an aerodynamic cover for the inner case 48. A downstream/aft portion of the inner housing structure 36 such as, for example, a core nozzle 50 of the inner nacelle structure 42 also covers at least a portion of an exhaust center body 52. More particularly, the inner nacelle structure 42 and its core nozzle 50 axially overlap and extend circumferentially about (e.g., completely around) the exhaust center body 52. The core nozzle 50 and the exhaust center body 52 thereby collectively form a downstream/aft portion of a core flow path 54. This core flow path 54 extends axially within the aircraft propulsion system 20, through the engine sections 27A-29B (e.g., the engine core), to a core nozzle outlet 55 at a downstream/aft end of the aircraft propulsion system 20.

Each of the engine sections 26, 27A, 27B, 29A and 29B of FIG. 1 includes a respective rotor 56-60. Each of these rotors 56-60 includes a plurality of rotor blades arranged circumferentially around and connected to one or more respective rotor disks.

The fan rotor 56 and the LPC rotor 57 are connected to and driven by the LPT rotor 60 through a low speed shaft 62. The HPC rotor 58 is connected to and driven by the HPT rotor 59 through a high speed shaft 64. The shafts 62 and 64 are rotatably supported by a plurality of bearings (not shown). Each of these bearings is connected to the aircraft propulsion system housing 32 by at least one stationary structure such as, for example, an annular support strut.

During operation, air enters the aircraft propulsion system 20 through an airflow inlet 66. This air is directed through the fan section 26 and into the core flow path 54 and the bypass flow path 44. The air within the core flow path 54 may be referred to as "core air". The air within the bypass flow path 44 may be referred to as "bypass air".

The core air is compressed by the compressor rotors 57 and 58 and directed into a combustion chamber of a combustor in the combustor section 28. Fuel is injected into the combustion chamber and mixed with the compressed core air to provide a fuel-air mixture. This fuel air mixture is ignited and combustion products thereof flow through and sequentially cause the turbine rotors 59 and 60 to rotate. The rotation of the turbine rotors 59 and 60 respectively drive rotation of the compressor rotors 58 and 57 and, thus, compression of the air received from a core airflow inlet. The rotation of the turbine rotor 60 also drives rotation of the fan rotor 56, which propels bypass air through and out of the bypass flow path 44. The propulsion of the bypass air may account for a majority of thrust generated by the turbine engine 22, e.g., more than seventy-five percent (75%) of engine thrust. The aircraft propulsion system 20 of the present disclosure, however, is not limited to the foregoing exemplary thrust ratio. Furthermore, the aircraft propulsion system 20 of the present disclosure is not limited to the exemplary gas turbine engine configuration described above.

The combustion products flowing through the core flow path 54 and out of the aircraft propulsion system 20 can subject various propulsion system components to severe operating conditions. Components that form and/or are proximate the core flow path 54, for example, may routinely be subjected to relatively high operating temperatures, relatively high thermally induced stresses and/or relatively large temperature gradients particularly, for example, during engine startup and/or aircraft takeoff. Such operating conditions may become even more severe as aircraft propulsion system engineers continue to push design limits to further increase engine efficiency and/or engine thrust.

The components that form and/or are proximate the core flow path 54 may be configured to accommodate the severe operating conditions through material selection and/or by providing cooling. The core nozzle 50 and the exhaust center body 52, for example, may be manufactured from heat resistant material(s) such as, but not limited to, ceramic material (e.g., pure ceramic material, ceramic matrix composite (CMC) material), metal (e.g., metal matrix composite (MMC) material, Aluminum, Titanium or high temperature super alloy) and/or non-metal and/or non-ceramic material (e.g., polymer, polymer matrix composite (PMC) material). The core nozzle 50 is also or alternatively configured with internal cooling as described below.

Figure 2:
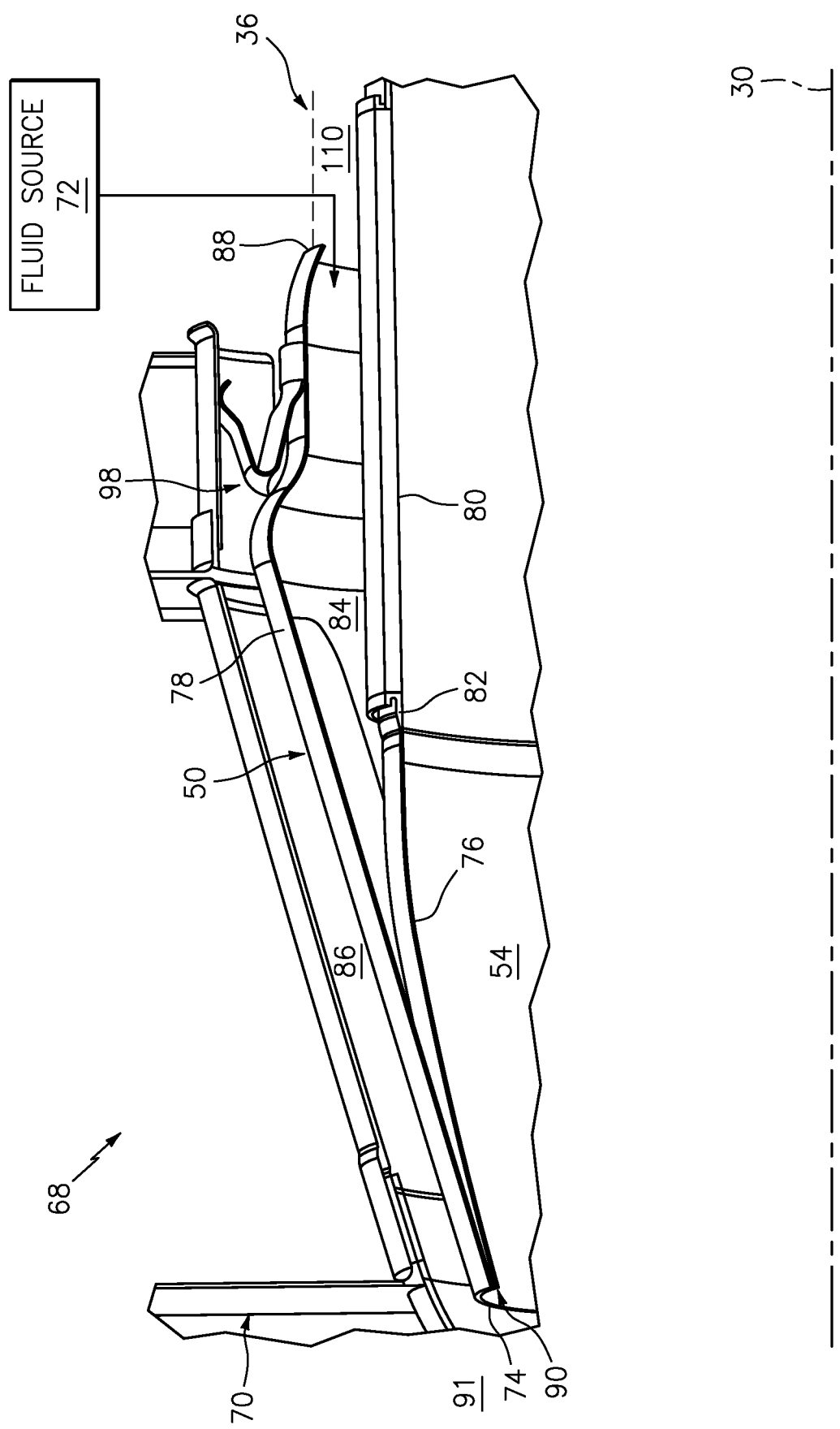
FIG. 2 is a perspective side sectional illustration of a portion of an assembly for the aircraft propulsion system.

FIG. 2 illustrates a portion (e.g., a nozzle system) of an assembly 68 for the aircraft propulsion system 20. This aircraft propulsion system assembly 68 includes the outer housing structure 34 (see FIG. 1), the inner housing structure 36, the exhaust center body 52 (see FIG. 1) and a pylon structure 70. The aircraft propulsion system assembly 68 of FIG. 2 also includes a fluid source 72 (e.g., a cooling air source) configured to provide fluid (e.g., cooling air) to the inner housing structure 36 for cooling at least the core nozzle 50.

Figure 3:
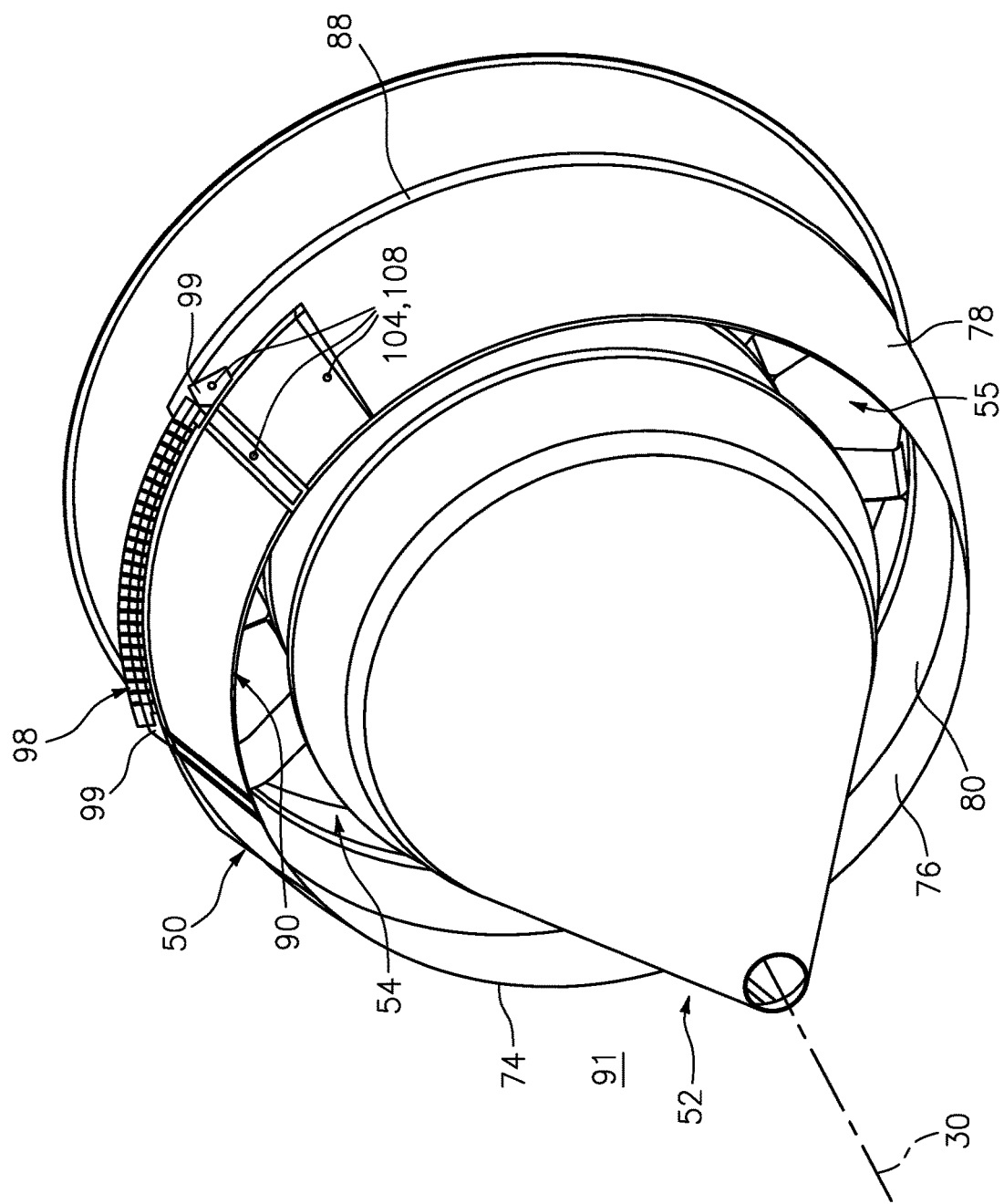
FIG. 3 is a perspective illustration of another portion of the aircraft propulsion system assembly.

The core nozzle 50 of FIG. 3 extends circumferentially about (e.g., completely around) the axial centerline 30. The core nozzle 50 may thereby be configured with a full-hoop body; however, the present disclosure is not limited to such an exemplary embodiment. Referring to FIG. 2, the core nozzle 50 extends axially along the axial centerline 30 from a nozzle forward/upstream axial end to a nozzle aft/downstream axial end 74.

The nozzle 50 includes a radial inner nozzle panel 76 and a radial outer nozzle fairing 78. The nozzle 50 of FIG. 2 also includes a radial inner nozzle core panel 80; e.g., an acoustic panel.

The nozzle panel 76 is configured to form an outer peripheral boundary of an aft portion of the core flow path 54 at the aft axial end 74 of the core nozzle 50. The nozzle panel 76 of FIG. 2 extends axially along the axial centerline 30 from a forward/upstream axial end 82 of the nozzle panel 76 to the aft axial end 74 of the core nozzle 50. The forward axial end 82 of the nozzle panel 76 of FIG. 2 is connected to the nozzle core panel 80. The nozzle panel 76 of FIG. 3 extends circumferentially about (e.g., completely around) the axial centerline 30. The nozzle panel 76 may thereby be configured with a full-hoop body; however, the present disclosure is not limited to such an exemplary embodiment.

The nozzle panel 76 of FIG. 2 is configured as a solid panel. The nozzle panel 76, for example, may be constructed as or otherwise include a non-perforated/non-porous panel. The nozzle panel 76 may thereby fluidly decouple the core flow path 54 from an internal flow passage 84 of the core nozzle 50 located radially outboard of the nozzle panel 76.

A portion of the nozzle fairing 78 is configured to form an inner peripheral boundary of a (e.g., sealed) cavity 86 between the core nozzle 50 and a portion of the pylon structure 70. This portion of the nozzle fairing 78 may be arranged at a top-center location of the core nozzle 50 and, thus, circumferentially and axially aligned with the pylon structure 70. Referring to FIG. 1, another portion of the nozzle fairing 78 is configured to form an inner peripheral boundary of an aft portion of the bypass flow path 44 at the aft axial end 74 of the core nozzle 50 or a surface downstream of the bypass flow path 44 as shown in FIG. 1.

The nozzle fairing 78 of FIG. 2 extends axially along the axial centerline 30 from a forward/upstream axial end 88 of the nozzle fairing 78 to the aft axial end 74 of the core nozzle 50. The nozzle fairing 78 of FIG. 2 thereby axially overlaps the nozzle panel 76 as well as the nozzle core panel 80. The nozzle fairing 78 of FIG. 3 extends circumferentially about (e.g., completely around) the axial centerline 30. The nozzle fairing 78 may thereby be configured with a full-hoop body; however, the present disclosure is not limited to such an exemplary embodiment.

The nozzle fairing 78 of FIG. 2 is configured as a solid panel. The nozzle fairing 78, for example, may be construct as or otherwise include a non-perforated/non-porous panel. The nozzle fairing 78 may thereby fluidly decouple the internal flow passage 84 from the cavity 86.

The nozzle fairing 78 of FIGS. 2 and 3 circumscribes and thereby circumferentially overlaps the nozzle panel 76 as well as the nozzle core panel 80. Referring to FIG. 2, the nozzle fairing 78 is displaced radially outward from the nozzle panel 76 as well as the nozzle core panel 80 so as to form the internal flow passage 84 radially between the nozzle fairing 78 and the nozzle components 76 and 80. The nozzle fairing 78, however, is attached (e.g., mechanically fastened or welded, adhered and/or otherwise bonded) to the nozzle panel 76 at the aft axial end 74 of the core nozzle 50. More particularly, the nozzle fairing 78 and the nozzle components 76, 78 and 80 are arranged such that at least a portion of the internal flow passage 84 radially tapers as the passage 84 extends axially towards/to the aft axial end 74 of the core nozzle 50.

The internal flow passage 84 extends radially between and is formed by the nozzle fairing 78 and the nozzle components 76 and 80. The internal flow passage 84 extends circumferentially about the axial centerline 30. The internal flow passage 84 extends axially along the axial centerline 30 within the core nozzle 50 to its core nozzle outlet 90 at the aft axial end 74 of the core nozzle 50. The internal flow passage 84 is thereby fluidly coupled with an exterior environment 91 to the aircraft propulsion system 20 through the core nozzle outlet 90.

Figure 4:
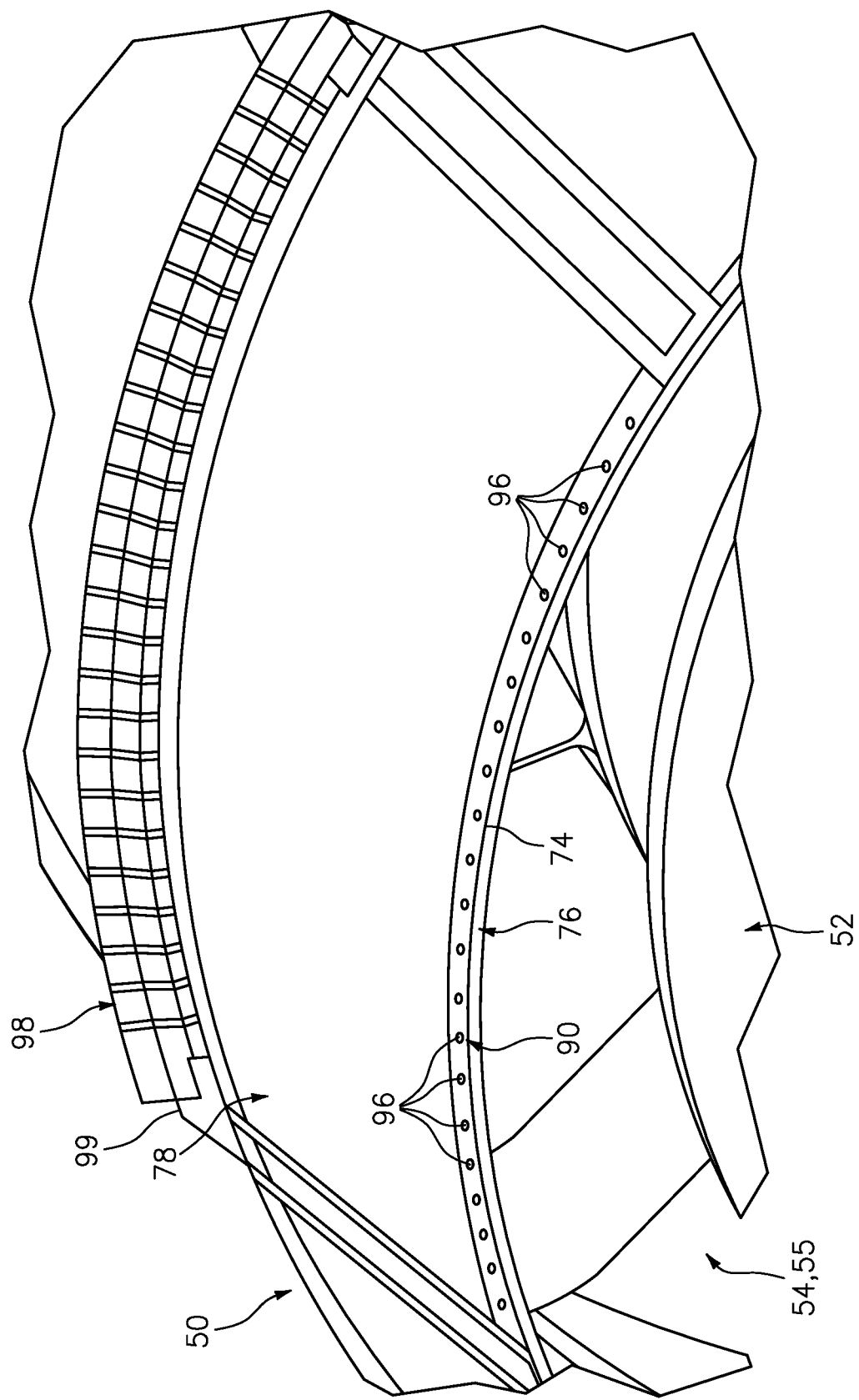
FIG. 4 is an enlarged perspective illustration of a portion of the aircraft propulsion system assembly of FIG. 3.
Figure 5:
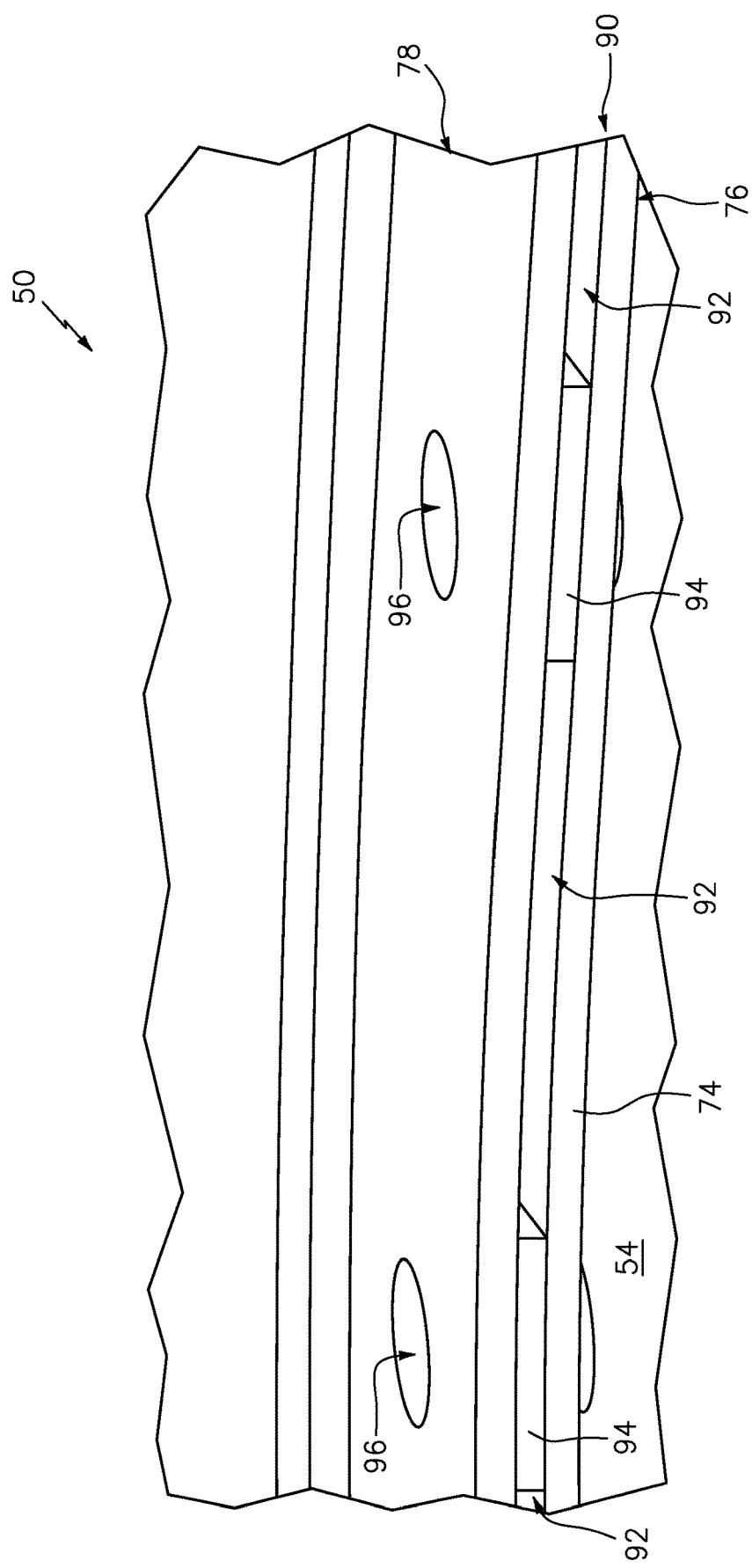
FIG. 5 is an enlarged perspective illustration of a portion of the aircraft propulsion system assembly of FIG. 4 at an axial end of a core nozzle.

The core nozzle outlet 90 of FIG. 4 is located at (e.g., on, adjacent or proximate) the aft axial end 74 of the core nozzle 50. This core nozzle outlet 90 extends circumferentially about the axial centerline 30 (see FIG. 3). The core nozzle outlet 90 of FIG. 5 includes/is formed by a plurality of core nozzle outlet orifices 92; e.g., apertures such as slots, channels, through holes, etc. These outlet orifices 92 are arranged circumferentially about the axial centerline 30 in an array. Each of these outlet orifices 92 is formed by and extends radially between the nozzle panel 76 and the nozzle fairing 78. Each of the outlet orifices 92 is also formed by and extends laterally (e.g., circumferentially or tangentially) between a respective laterally neighboring pair of spacers 94, where each spacer 94 extends radially between and is fixedly connected to one or both of the nozzle components 76 and 78 via a respective connection 96; e.g., a mechanical fastener (e.g., a bolt or rivet), a bond (e.g., weld) connection, etc. Thus, since the spacers 94 and the connections 96 fixedly secure the nozzle components 76 and 78 together, the core nozzle outlet 90 is configured as a fixed area outlet. The term "fixed area outlet" is used herein to describe an outlet with a cross-sectional area (e.g., viewed in a plane perpendicular to an axial centerline (e.g., 30)) that remains substantially or completely constant during the course of aircraft propulsion system operation. Such a fixed area outlet is in contrast to a variable area outlet with a cross-sectional area changes during aircraft propulsion system operation. The present disclosure, however, is not limited to the foregoing exemplary fixed area outlet configuration.

Figure 6:
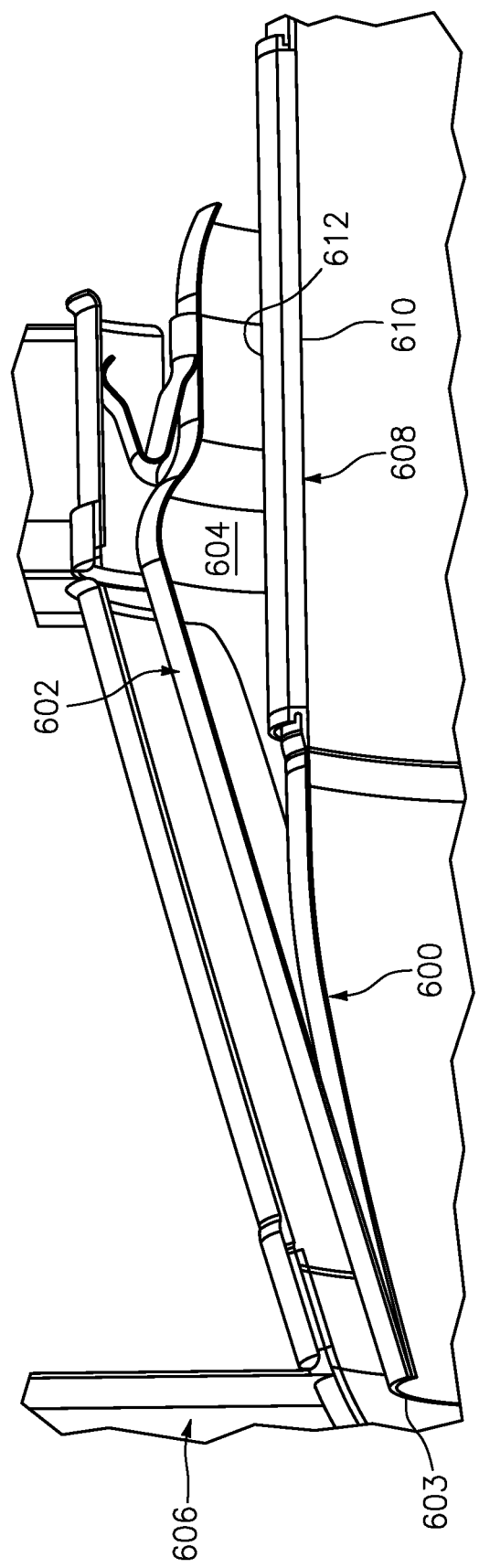
FIG. 6 is a perspective side sectional illustration of a portion of another aircraft propulsion system assembly.

Referring to FIG. 2, during operation of the aircraft propulsion system 20, the fluid source 72 provides the fluid (e.g., cooling air) to the internal flow passage 84 of the core nozzle 50. As the fluid travels axially through the internal flow passage 84 towards the aft axial end 74, the fluid convectively cools each of the nozzle components 76, 78 and 80. The fluid also provides a quasi-insulative fluid barrier between the nozzle components 78 and 76, 80 and, thus, between the core flow path 54 and the pylon structure 70. The fluid is thereafter directed (e.g., exhausted) out from the core nozzle 50 and its passage 84 through the core nozzle outlet 90 and its orifices 92 (see FIG. 5). By contrast, referring to FIG. 6, if a nozzle panel 600 was attached to a nozzle fairing 602 without including an outlet (e.g., 90 of FIG. 2) therebetween at an aft end 603, air flow into a plenum 604 between the nozzle components 600 and 602 may stagnate and allow additional heat transfer through convection and/or radiation from the nozzle panel 600 to the nozzle fairing 602 and then to a pylon structure 606. This additional heat transfer may increase thermal stresses within the nozzle fairing 602 as well as the pylon structure 606. Furthermore, without including an outlet, a nozzle core 608 may not be cooled and thereby may be subject to relatively high thermal gradients and/or thermal stresses between a face sheet 610 and a back sheet 612 of the nozzle core 608, particularly where the nozzle core 608 has an acoustic design.

In some embodiments, referring to FIG. 2, the aircraft propulsion system assembly 68 may also include a (e.g., fire) seal element 98 configured to seal a gap between the nozzle fairing 78 and the pylon structure 70. The seal element 98 may thereby close/seal an axial end of the cavity 86. Referring to FIG. 3, the seal element 98 may be attached to the nozzle fairing 78 and extend circumferentially about the axial centerline 30 between, for example, opposing sides of the pylon structure 70 (not shown in FIG. 3). For example, the seal element 98 of FIG. 3 extends between end structures 99 (e.g., batwings, walls, seal elements, etc.).

Figure 7A:
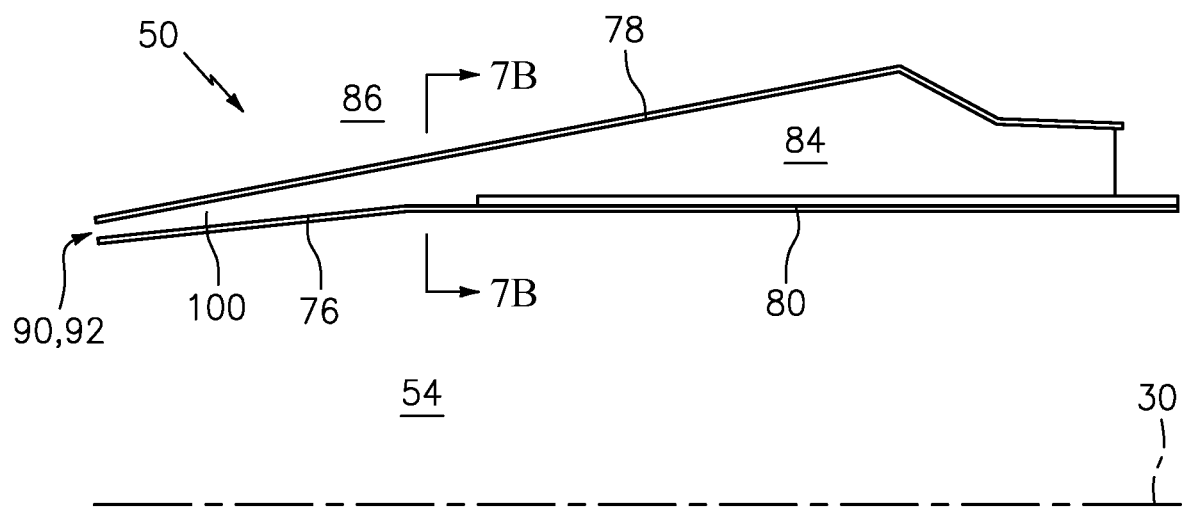
FIG. 7A is a schematic side sectional illustration of a core nozzle at a first circumferential location about an axial centerline.
Figure 7B:
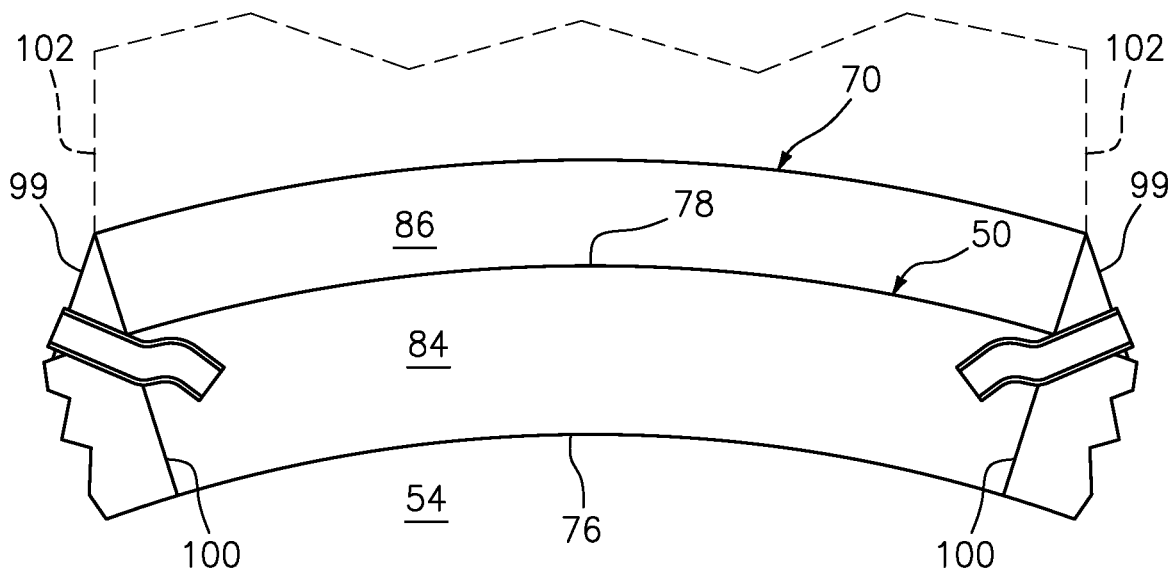
FIG. 7B is a cross-sectional illustration of a portion of the core nozzle along line 7B-7B in FIG. 7A.
Figure 7C:
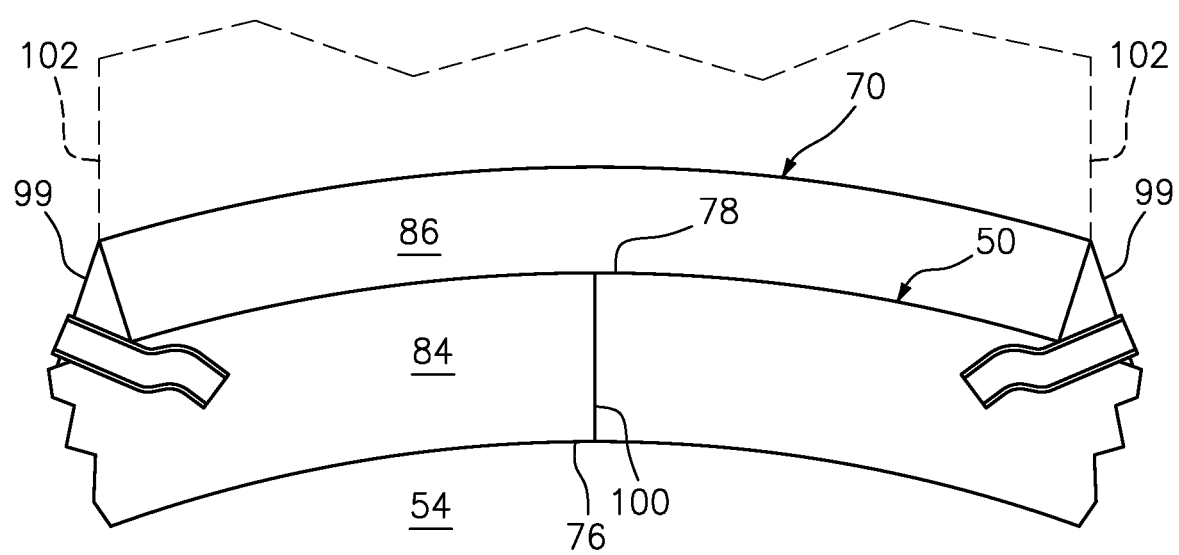
FIG. 7C is a cross-sectional illustration of an alternative portion of the core nozzle.

In some embodiments, referring to FIGS. 7A and 7B, the core nozzle 50 may include one or more walls 100. Each of these walls 100 may be configured as a flow divider/cross-flow blocker. Each wall 100, for example, extends radially between and is connected to the nozzle components 76 and 80 and the nozzle fairing 78. Each wall 100 of FIG. 7A extends axially along the core nozzle 50, for example, between its axial ends. The internal flow passage 84 of FIG. 7B is thereby laterally constrained/formed by the walls 100. The walls 100 may be arranged to be laterally aligned with or proximate to opposing sides 102 of the pylon structure 70. The internal flow passage 84 is thereby laterally and axially aligned with and (e.g., directly) radially below the pylon structure 70 as well as arranged at the top-center location of the inner housing structure 36 and its core nozzle 50. Of course, in other embodiments, the walls 100 may be otherwise positioned. For example, in the embodiment of FIG. 7C, a single wall 100 is located (e.g., midway) laterally between the opposing sides 102 of the pylon structure 70.

Figure 8:
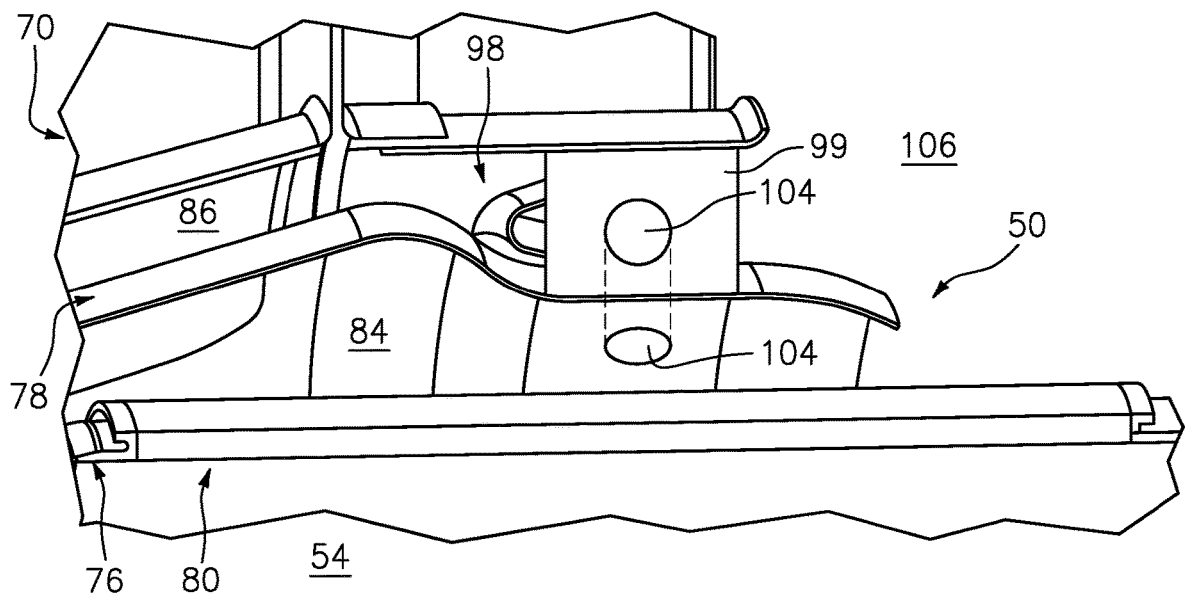
FIG. 8 is a perspective side sectional illustration of the core nozzle configured with one or more apertures in a nozzle fairing.

In some embodiments, referring to FIG. 8, the nozzle fairing 78 may include one or more apertures 104 located, for example, axially forward/upstream of the seal element 98. The apertures 104 may also or alternatively be located to a side of the seal element 98; e.g., see possible locations shown in FIG. 3. Each aperture 104 of FIG. 8 extends radially through the nozzle fairing 78. Each aperture 104 thereby fluidly couples the internal flow passage 84 with a plenum 106 (e.g., another flow passage, cavity, etc.) that is disposed radially outboard of the nozzle fairing 78 next to a respective end structure 99, for example, through at least one additional aperture 104 in the respective end structure 99; see also FIGS. 3, 7B and 7C.

Figure 9A:
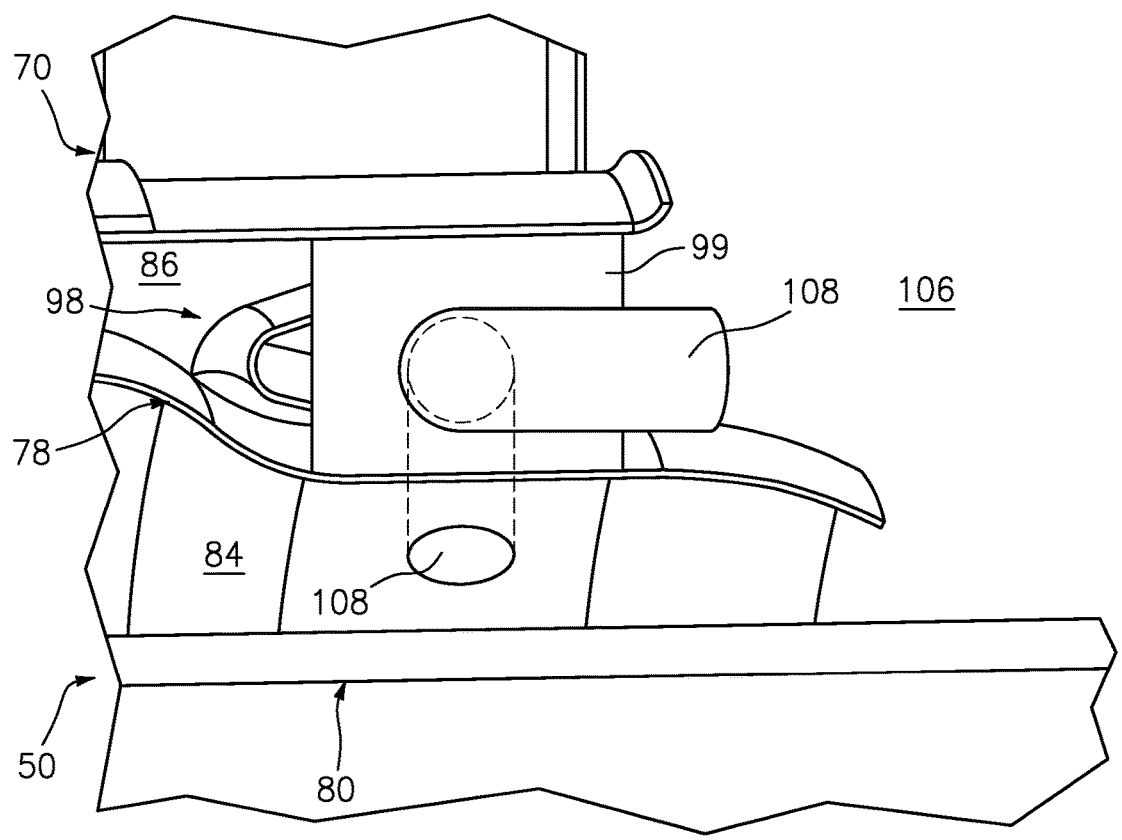
FIGS. 9A-9C are perspective side sectional illustrations of the core nozzle configured with various different scoops with the nozzle fairing.
Figure 9B:
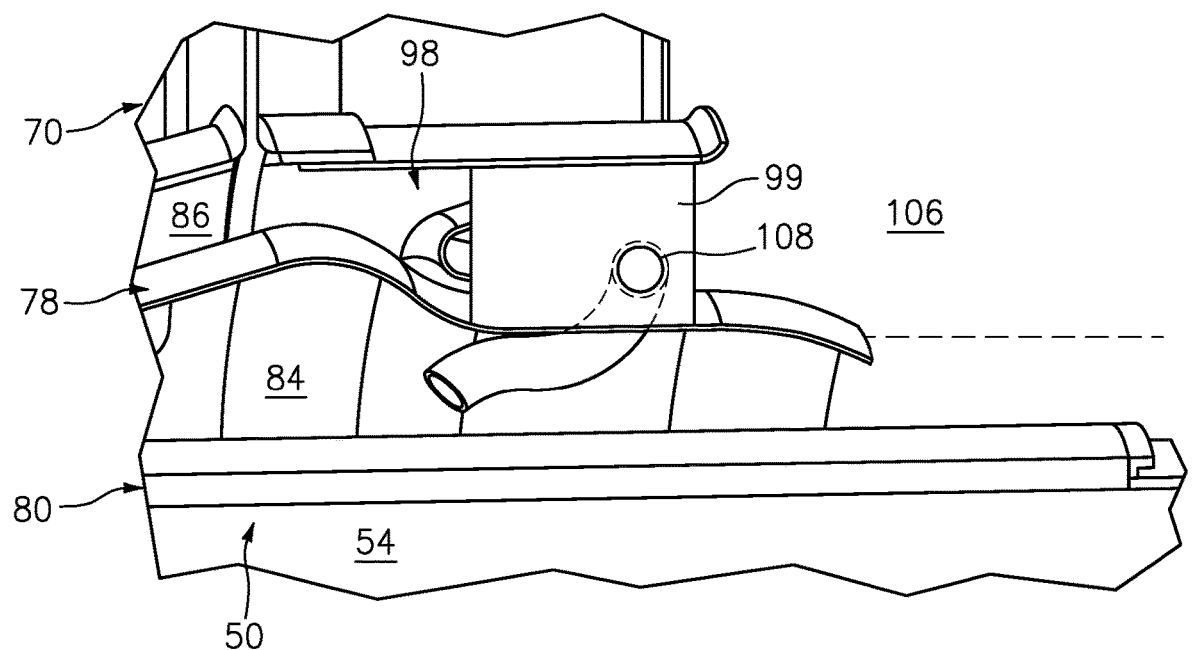
Figure 9C:
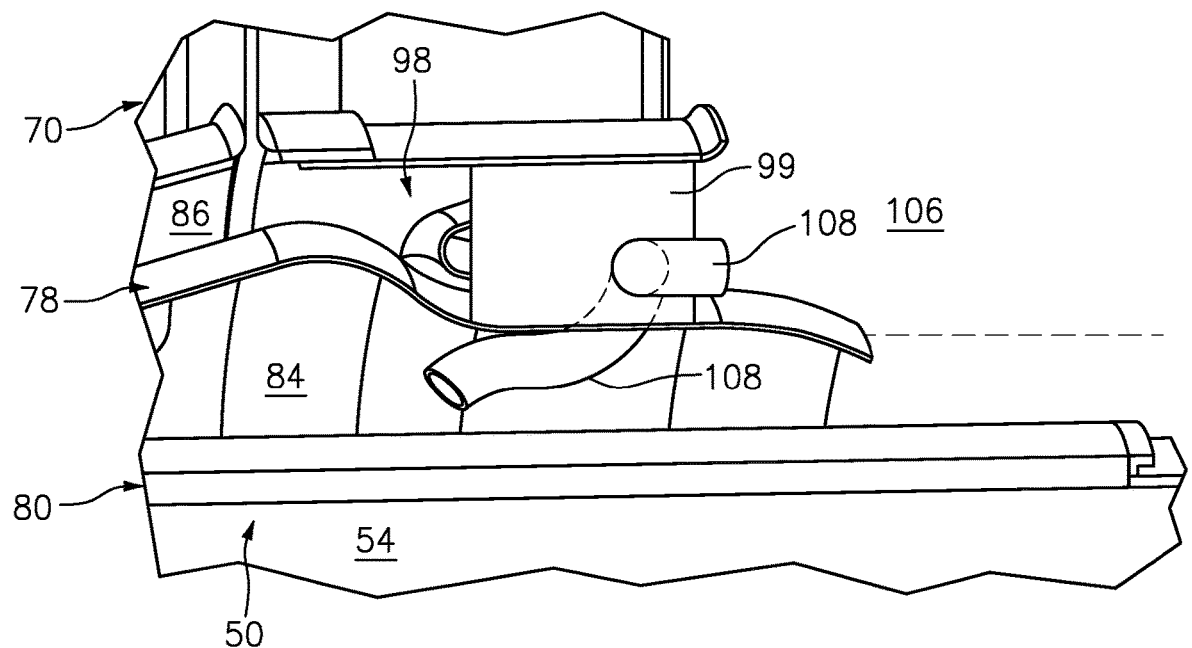

In some embodiments, referring to FIGS. 9A-9C, a scoop 108 may be provided with the core nozzle 50 located, for example, axially forward/upstream of and/or next to the seal element 98. This scoop 108 is configured to direct fluid (e.g., cooling air) from the plenum 106 and into the internal flow passage 84; see also FIGS. 7B and 7C. The scoops 108 of FIGS. 9A-9C, for example, are configured to direct the fluid to impinge onto a backside of the nozzle core panel 80. In some embodiments, referring to FIG. 9A, the scoop 108 may extend through the nozzle fairing 78 and the end structure 99 where an inlet end of the scoop 108 may project out past the end structure into the plenum 106 and/or an outlet end of the scoop 108 may be flush with the nozzle fairing 78. In some embodiments, referring to FIG. 9B, the scoop 108 may extend through the nozzle fairing 78 and the end structure 99 where the inlet end of the scoop 108 may be flush with an exterior surface of the end structure 99 and/or the outlet end of the scoop 108 may project out past the nozzle fairing 78 into the internal flow passage 84. In some embodiments, referring to FIG. 9C, the scoop 108 may extend through the nozzle fairing 78 and the end structure 99 where the inlet end of the scoop 108 projects out past the end structure 99 into the plenum 106 and the outlet end of the scoop 108 may project out past the nozzle fairing 78 into the internal flow passage 84. The present disclosure, of course, is not limited to the foregoing exemplary scoop configurations.

In some embodiments, referring to FIGS. 8 and 9A-9C, the fluid source 72 (see FIG. 2) may be configured as a bypass duct which forms the bypass flow path 44 (see FIG. 1). For example, air from the bypass flow path 44 may be bleed into the plenum 106. Air within the plenum 106 may then flow into the internal flow passage 84 through a fluid coupling; e.g., the aperture 104 in FIG. 8 and/or the scoop 108 in FIGS. 9A-9C.

In some embodiments, referring to FIG. 2, the fluid source 72 may be configured as a nacelle core compartment 110. Referring to FIG. 1, this core compartment 110 is a cavity radially between and, for example, formed by the components 42 and 48.

Figure 10:
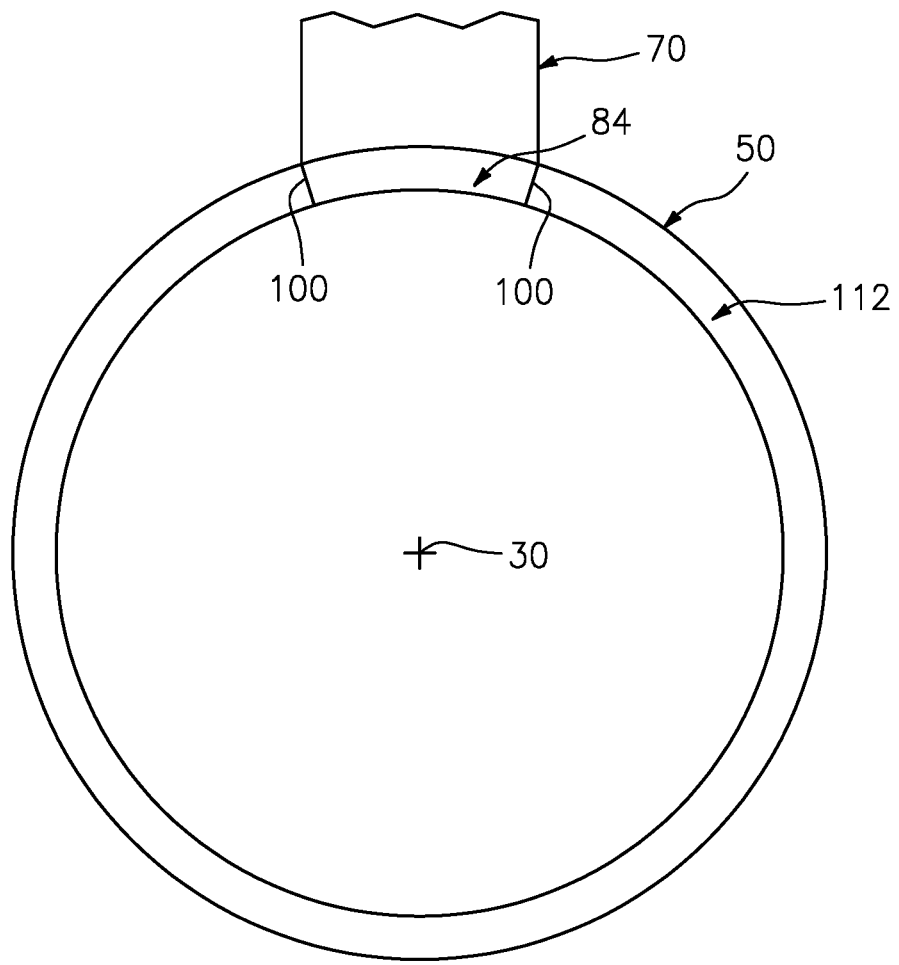
FIG. 10 is a schematic cross-sectional illustration of a portion of the aircraft propulsion system assembly.
Figure 11:
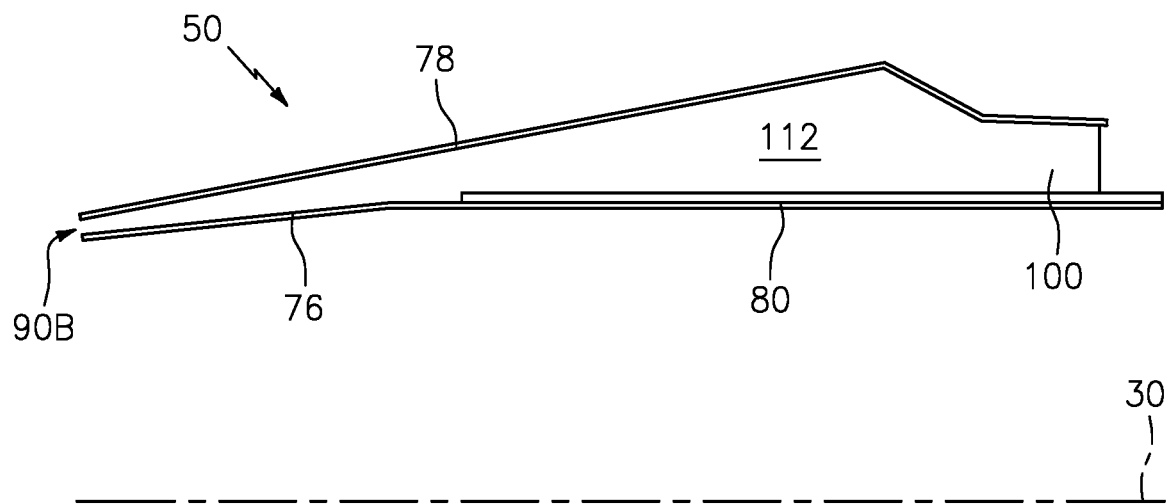
FIG. 11 is another schematic side sectional illustration of the core nozzle at a second circumferential location about the axial centerline.

In some embodiments, referring to FIG. 10, the core nozzle 50 may also be configured with a second internal flow passage 112. This second internal flow passage 112 may be circumferentially adjacent the internal flow passage 84. The second internal flow passage 112 of FIG. 10, for example, extends circumferentially about the axial centerline 30 between and to the walls 100. Referring to FIG. 11, the second internal flow passage 112 extends radially between the nozzle components 76 and 80 and the nozzle fairing 78. The second internal flow passage 112 extends axially along the axial centerline 30 to its core nozzle outlet 90B, which may be the same as or discrete from the core nozzle outlet 90.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
   a nozzle extending axially along and circumferentially about an axial centerline, the nozzle including a nozzle panel and a nozzle fairing fixedly connected to the nozzle panel at an axial end of the nozzle;
   the nozzle configured with a first internal flow passage radially between the nozzle panel and the nozzle fairing, the first internal flow passage extending axially within the nozzle to a first outlet between the nozzle panel and the nozzle fairing at the axial end of the nozzle; and
   the nozzle further configured with a second internal flow passage radially between the nozzle panel and the nozzle fairing, and the second internal flow passage extending axially within the nozzle to a second outlet between the nozzle panel and the nozzle fairing at the axial end of the nozzle, wherein the second internal flow passage is circumferentially adjacent the first internal flow passage.

2. The assembly of claim 1, wherein the nozzle fairing is radially outboard of and overlaps the nozzle panel.

3. The assembly of claim 1, wherein the nozzle panel forms a peripheral outer portion of a core flow path within the aircraft propulsion system, and the first internal flow passage is radially outboard of the core flow path.

4. The assembly of claim 1, wherein
   the nozzle fairing is fixed relative to the nozzle panel through a plurality of spacers;
   each of the plurality of spacers extends radially between the nozzle panel and the nozzle fairing; and
   the first outlet comprises an outlet orifice, the outlet orifice formed circumferentially between and by a neighboring pair of the plurality of spacers, and the outlet orifice formed radially between and by the nozzle panel and the nozzle fairing.

5. The assembly of claim 1, wherein
   the first outlet comprises a plurality of outlet orifices arranged circumferentially about the axial centerline at the axial end of the nozzle; and
   the first internal flow passage extends axially within the nozzle to the plurality of outlet orifices.

6. The assembly of claim 1, wherein the first outlet comprises a fixed area outlet.

7. The assembly of claim 1, further comprising:
   a pylon structure;
   the first internal flow passage arranged below and circumferentially aligned with the pylon structure.

8. The assembly of claim 1, wherein
   the nozzle further includes a wall;
   the wall extends radially between the nozzle panel and the nozzle fairing; and
   the first internal flow passage extends circumferentially to the wall.

9. The assembly of claim 1, wherein
   an aperture extends radially through a sidewall of the nozzle fairing; and
   the aperture fluidly couples the first internal flow passage with a plenum radially outboard of the nozzle fairing.

10. The assembly of claim 1, wherein the nozzle further includes a scoop configured to direct air, which is within a plenum radially outboard of the nozzle fairing, into the first internal flow passage.

11. The assembly of claim 1, further comprising a fluid source fluidly coupled with and configured to provide fluid to the first internal flow passage.

12. The assembly of claim 11, wherein the fluid source comprises a nacelle core compartment.

13. The assembly of claim 11, wherein the fluid source comprises a bypass flow path.

14. The assembly of claim 1, further comprising:
   a pylon structure; and
   a seal element sealing a gap between the nozzle fairing and the pylon structure, the seal element extending circumferentially about the axial centerline.

15. The assembly of claim 1, further comprising:
   an outer nacelle structure;
   an inner nacelle structure within the outer nacelle structure, the inner nacelle structure extending axially along the centerline to the axial end of the nozzle; and
   a bypass flow path formed radially between the outer nacelle structure and the inner nacelle structure.

* * * * *